Dec. 26, 1933.  C. W. WYMAN  1,940,929
ELECTRIC MOTOR CONTROLLING SYSTEM
Filed May 20, 1931
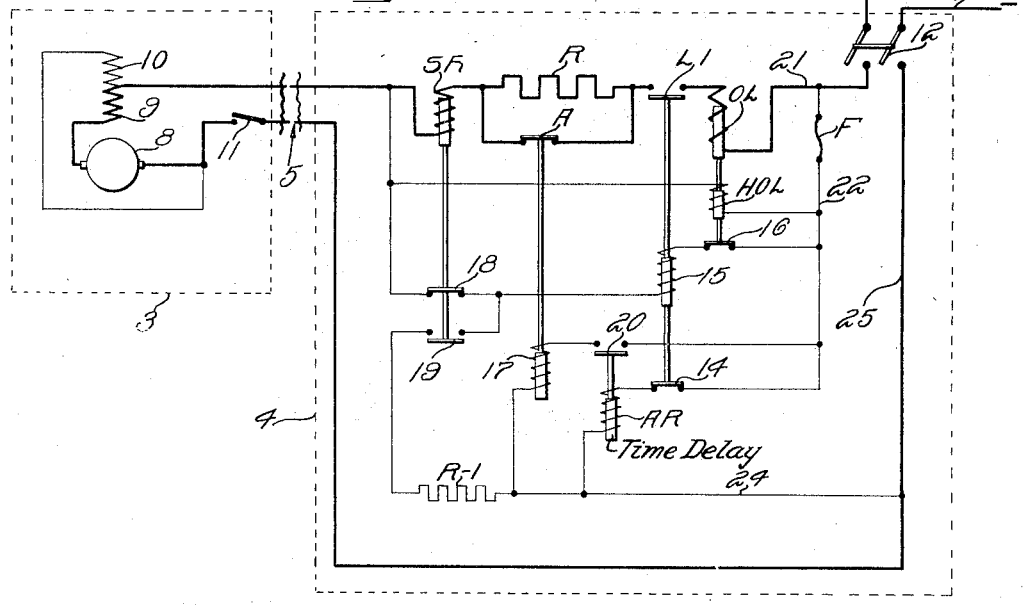
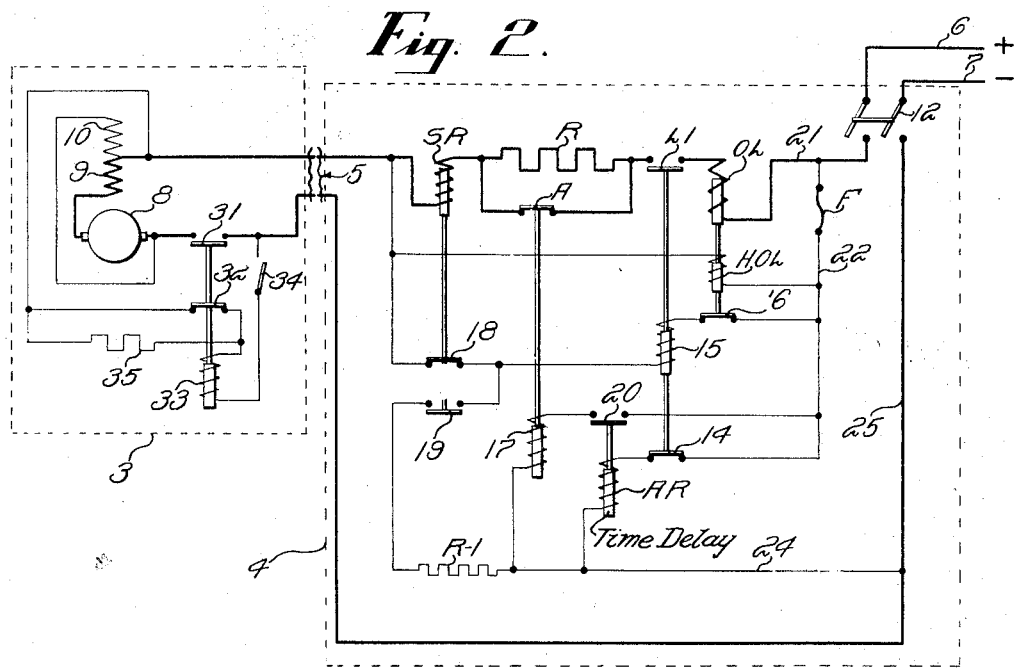
INVENTOR:
CHARLES W. WYMAN.
BY
ATT'Y.

Patented Dec. 26, 1933

1,940,929

UNITED STATES PATENT OFFICE 1,940,929

ELECTRIC MOTOR CONTROLLING SYSTEM

Charles W. Wyman, Claremont, N. H., assignor to Sullivan Machinery Company, a corporation of Massachusetts Application May 20, 1931. Serial No. 538,811

16 Claims. (Cl. 172—288)

My invention relates to electric motor controlling systems and more particularly to motor controlling systems for use with mining machines.

With the small amount of space available in coal cutting machines, it is highly imperative that as much as possible of the controlling mechanism for their motors be removed from the machines themselves and located in places where there is more space available. Accordingly it is customary to arrange the control panels and the resistances of electric coal cutters upon the trucks upon which such machines are transported from place to place, or, in the case of longwall coal cutters, in control boxes at points remote from the working face or from the machine during its cutting operations. Such systems require commonly at least one more wire in the cable running to the machine than is necessary to conduct the operating current to the motor. One object of the present invention is to provide an improved control system in which no additional wire is necessary. Another object of the invention is to provide an improved motor controlling system in which with but two wires extending between the machine and its remotely located controlling apparatus it may be possible to connect the motor to the line initially through resistance and subsequently directly. A further object is to provide an improved controlling system of the character mentioned in which overloading is prevented and the motor and control apparatus protected. Other objects and advantages will subsequently appear.

In the accompanying drawing, in which two forms of the invention are shown for purposes of illustration, Fig. 1 shows a wiring diagram for an illustrative embodiment in which the contactor upon a machine is manually operated, while Fig. 2 shows a similar wiring diagram for another illustrative embodiment in which there is a pilot control of the contactor on the machine.

Referring first to the system illustrated in Fig. 1, the small broken-line rectangle 3 represents space upon a mining machine, the larger broken-line rectangle 4 represents space at a remote point—for example space in a control box in an entry; and 5 is a two-conductor cable leading from the control box to the machine. Main power lines, for example a trolley line and a track, are designated 6, 7. The mining machine comprises a compound wound motor 8 having series field 9 and shunt field 10, and mounted upon the machine is a contactor 11.

A double-pole main line switch 12 connects the apparatus at a point remote from the machine with the power lines 6, 7. This controlling apparatus comprises a line resistor R; a line contactor L—1 with normally closed interlock switch 14 and operating coil 15; a normally closed contactor A for cutting out the resistor R having a controlling solenoid 17; an overload relay with series coil OL, holding coil HOL and normally closed movable contactor 16; a series relay with coil, SR, controlling a pair of switches 18, 19, respectively normally closed and normally open; a time delay relay, with coil AR, controlling a switch 20 whose position governs the opening of the contactor A; and a resistance R—1. The connections will be described in connection with the operation.

Upon closure of the main line switch, a circuit is established through a conductor 21, fuse F, conductor 22, interlock 14, coil AR and a conductor 24 to a conductor 25 which serves to connect the negative line 7 through the main line switch 12 to contactor 11 and the motor 8. Coil AR closes switch 20 and a circuit is then established through conductor 21, fuse F, conductor 22, switch 20, coil 17, conductor 24 and conductor 25 between the power lines, and contactor A is opened so that initial current flow to the motor 8 will of necessity take place through resistance R. No further operations occur until contactor 11 is closed.

When the machine runner closes contactor 11, a circuit is established from line 6, through conductors 21, 22, switch 16, coil 15, switch 18, through the motor, and contactor 11 to line 25 and so to the line 7. Coil 15, thus energized, closes contactor L—1, establishing a circuit from the positive side of the line through conductor 21, coil OL, contactor L—1, resistor R, coil SR, the motor, contactor 11, and conductor 25 back to the negative side of the line. The motor is therefore started.

Closure of contactor L—1 is accompanied by opening of interlock 14, with discontinuation of current supply to time delay relay coil AR. This coil, which may be of the copper jacketed type, releases its armature only after an interval adequate to permit the desired speeding up of the motor, and accordingly switch 20 opens and deenergizes coil 17 only when the motor has acquired the necessary speed. Deenergization of coil 17 allows contactor A to close, shunting the resistor R and putting the motor on the line.

Obviously upon closure of contactor L—1, coil SR is energized. This opens 18 and closes 19 and connects coil 15 in a circuit including conductor 22, switch 16, coil 15, switch 19, resistance R—1, and conductor 24, between the conductors 21 and 25.

In the event of an overload, overload coil OL opens switch 16, deenergizing coil 15, causing opening of L—1. Coil HOL is, however, energized through conductor 22, the motor, contactor 11 and conductor 25, so that the switch 16 is retained in open position until contactor 11 is opened by the machine runner.

The motor may be stopped by opening contactor 11. This deenergizes coil SR, and switch 19 drops open, deenergizing coil 15 and causing contactor L—1 to open. Opening of L—1 is accompanied by closure of interlock 14, and so coil AR is energized, switch 20 closed, coil 17 energized, contactor A opened, and everything is ready to start again.

The system illustrated in Fig. 2 does not require extended description and explanation since it differs only in the provision of a pilot control for the contactor at the machine. Corresponding parts are correspondingly numbered. Contactor 11 is replaced by an electrically operated contactor 31, carrying an interlock 32. A solenoid 33 controlled by a pilot switch 34 closes the contactor 31 and upon closure of the latter a resistance 35, previously shunted by the interlock 32, cuts down the current in coil 33. Opening of the pilot switch 34 deenergizes coil 33 and effects opening of contactor 31. The mode of operation of this system is self-evident, in the light of the extended description given in connection with Fig. 1, and needs not be set forth at length, since it is so similar.

From the foregoing description it will be evident that I have provided controlling systems each of which permits ready control of a motor with a minimum of control apparatus at the latter and yet with but two conductors leading to it, that the motor may notwithstanding the absence of more than two conductors leading to it and its minimum of immediately adjacent control apparatus be started through resistance and protected against overloads, and that in the event of damage to the cable connecting the motor with its remotely located main control apparatus, the motor can not be started by grounding of a pilot wire or the like.

While there are in this application specifically described two forms which the invention may assume in practice, it will be understood that these forms are shown for purposes of illustration and that the invention may be modified and embodied in various other forms without departing from its spirit or the scope of the appended claims.

What I claim as new and desire to secure by Letters Patent is:

1. In combination, a source of power, a motor, a conductor leading from the motor to the source of power and having a switch therein adjacent the motor, another conductor leading from the motor, and means, between said conductor and the source of power, and remote from the motor, and including a resistance and a plurality of contactors of which one has electromagnetically operated means energized to preclude supply of current to said motor except through said resistance, for connecting the motor to the source of power through the resistance and automatically cutting out the resistance on closure of said switch, said two conductors being the only conductors leading from the motor.

2. In combination, a source of power, a motor, a conductor leading from the motor to the source of power and having a switch therein adjacent the motor, another conductor leading from the motor, means between said last mentioned conductor and the source of power at a point remote from the motor and including a resistance and a plurality of contactors for connecting the motor to the source of power through the resistance and automatically cutting out the resistance on closure of the switch, and overload protective means including a normally closed switch having a coil connected between the second conductor and the source of power and having means for precluding reclosure of said switch, after operation of said overload protective means, prior to reopening of said first mentioned switch, said two conductors being the only conductors leading from the motor.

3. In combination, a source of power, a motor, a conductor leading from the motor to the source of power and having a switch therein adjacent the motor, another conductor leading from the motor, said conductors being the only ones leading from said motor, means between said last mentioned conductor and the source of power at a point remote from the motor and including a resistance and a plurality of contactors for connecting the motor to the source of power through the resistance and automatically cutting out the resistance on closure of the switch, one of said contactors having electromagnetically operated means energized prior to closure of said switch and deenergized following closure of said switch, and overload protective means including a coil connected between said conductors and the source of power.

4. In combination, a source of power, a motor, a resistance, a starting contactor, a normally closed resistance shunting contactor, a main line switch, a conductor connecting the main line switch, starting contactor and the resistance and its shunting contactor with the motor, another conductor provided with a switch and connecting the motor with the source of power, said conductors being the only ones leading from said motor, means automatically operative to open the resistance shunting contactor on closure of the main line switch, and means automatically operative on closure of the second mentioned switch to effect successively closure of the starting and resistance shunting contactors.

5. In combination, a source of power, a motor, a resistance, a starting contactor, a resistance shunting contactor, an overload protective coil, a conductor connecting the overload protective coil, the starting contactor, and the resistance and its shunting contactor between the motor and the source of power, a second switch controlled conductor between the motor and the source of power, said conductors being the only ones leading from the motor, magnetic control devices for said contactors, and means controlled by the overload protective coil controlling the magnetic control device for the starting contactor.

6. In combination, a motor, a source of power, a circuit connecting the motor and the source of power and containing a switch traversed by the motor current during running of the motor, a second circuit between the motor and source of power including an overload coil, a starting contactor and a resistance, a circuit containing a contactor for shunting the resistance, electromagnetic means for controlling the starting contactor including a coil energized upon closure of said switch to effect closure of said starting contactor, and electromagnetic means for controlling the contactor for shunting the resistance including an actuating coil, a time delay relay controlling said coil, and a switch movable with the starting contactor for controlling the time delay relay.

7. In combination, a motor, a source of power, a circuit connecting the motor and the source of power and containing a pilot-controlled switch traversed by the motor current during running of the motor, a pilot switch and means controlled thereby for controlling said pilot-controlled switch, a second circuit between the motor and source of power including an overload coil, a starting contactor and a resistance, a circuit containing a contactor for shunting the resistance, electromagnetic means for controlling the starting contactor including a coil energized upon closure of said switch to effect closure of said starting contactor, and electromagnetic means for controlling the contactor for shunting the resistance including an actuating coil, a time delay relay controlling said coil, and a switch movable with the starting contactor for controlling the time delay relay.

8. In combination, a motor, a source of power, a circuit connecting the motor and the source of power and containing a switch traversed by the motor current during running of the motor, a second circuit between the motor and source of power including an overload coil, a starting contactor and a resistance, a circuit containing a contactor for shunting the resistance, electromagnetic means for controlling the starting contactor including a coil energized upon closure of said switch to effect closure of said starting contactor and arranged in a circuit containing a switch governed by said overload coil, and electromagnetic means for controlling the contactor for shunting the resistance including an actuating coil, a time delay relay controlling said coil, and a switch movable with the starting contactor for controlling the time delay relay.

9. In combination, a motor, a source of power, a circuit connecting the motor and the source of power and containing a pilot-controlled switch traversed by the motor current during running of the motor, a pilot switch and means controlled thereby for controlling said pilot-controlled switch, a second circuit between the motor and source of power including an overload coil, a starting contactor and a resistance, a circuit containing a contactor for shunting the resistance, electromagnetic means for controlling the starting contactor including a coil energized upon closure of said switch to effect closure of said starting contactor and arranged in a circuit containing a switch governed by said overload coil, and electromagnetic means for controlling the contactor for shunting the resistance including an actuating coil, a time delay relay controlling said coil, and a switch movable with the starting contactor for controlling the time delay relay.

10. In combination, a motor, a source of power, a circuit connecting the motor and the source of power and containing a switch, a second circuit between the motor and source of power including an overload coil, a starting contactor, a resistance, a series relay coil, a circuit containing a contactor for shunting the resistance, electromagnetic means for controlling the starting contactor including a coil energized on closure of said switch and arranged in a circuit containing a switch governed by said overload coil and also having two switches, one of which is a resistance introducing switch and both of which are governed by said series relay coil associated therewith, and electromagnetic means for controlling the contactor for shunting the resistance including an actuating coil, a time delay relay controlling said coil, and a switch movable with the starting contactor for controlling the time delay relay.

11. In combination, a motor, a source of power, a circuit connecting the motor and the source of power and containing a pilot-controlled switch, a second circuit between the motor and source of power including an overload coil, a starting contactor, a resistance, a series relay coil, a circuit containing a contactor for shunting the resistance, electromagnetic means for controlling the starting contactor including a coil energized on closure of said switch and arranged in a circuit containing a switch governed by said overload coil and also having a pair of switches, one of which is a resistance introducing switch and both of which are governed by said series relay coil, associated therewith, and electromagnetic means for controlling the contactor for shunting the resistance including an actuating coil, a time delay relay controlling said coil, and a switch movable with the starting contactor for controlling the time delay relay.

12. In combination, a motor, a source of power, a circuit connecting the motor and the source of power and containing a switch adjacent the motor, a second circuit between the motor and the source of power including at a point remote from the motor an overload coil, a starting contactor, a resistance, a series relay coil, a circuit containing a contactor for shunting the resistance, electromagnetic means for controlling the starting contactor including a coil energized on closure of said switch and arranged in a circuit containing a switch governed by said overload coil and also having a pair of switches, one of which is a resistance introducing switch and both of which are governed by said series relay coil, associated therewith, and electromagnetic means for controlling the contactor for shunting the resistance including an actuating coil, a time delay relay controlling said coil, and a switch movable with the starting contactor for controlling the time delay relay.

13. In combination, a motor, a source of power, a circuit connecting the motor and the source of power and containing a pilot-controlled switch adjacent the motor, a second circuit between the motor and the source of power including at a point remote from the motor an overload coil, a starting contactor, a resistance, a series relay coil, a circuit containing a contactor for shunting the resistance, electromagnetic means for controlling the starting contactor including a coil energized on closure of said switch and arranged in a circuit containing a switch governed by said overload coil and also having a pair of switches, one of which is a resistance introducing switch and both of which are governed by said series relay coil, associated therewith, and electromagnetic means for controlling the contactor for shunting the resistance including an actuating coil, a time delay relay controlling said coil, and a switch movable with the starting contactor for controlling the time delay relay.

14. In combination, a motor having terminals, a source of power, a starting panel and a starting resistance, and a two-wire cable extending from said motor to said starting panel and resistance, one of the wires of said cable being connected at one end to a motor terminal and the other at its corresponding end having at the motor a switch controlled connection with the other motor terminal, said two-wire cable containing all the conductors leading to the motor, the other ends of said wires being connectible at the panel one with the source of power and the other through automatic control devices governed by said switch and including devices energized prior to closure of said switch to effect initial supply of current to said motor, on closure of said switch, through said resistance, with the source of power.

15. In combination, a motor having terminals, a source of power, magnetically controlled starting devices remote from the motor and including electromagnetically operated contactors respectively closed and opened during starting of said motor, and means for connecting said motor terminals with the source of power by said starting devices including a two-wire-only connection extending from the source and starting devices to the motor, one of said wires having at the motor a switch through which the full motor current passes and operative to control the starting devices 16. In combination, a source of power, a motor, a resistance, a starting contactor, means associated with said resistance and movable to establish a circuit between the motor and the source of power independent of the resistance, a conductor connecting the motor through the resistance and the starting contactor with the source of power, another conductor provided with a switch and connecting the motor with the source of power, said conductors being the only ones leading from the motor, means automatically operative though said switch be open when said conductors are connected with the source of power to actuate said means associated with the resistance to preclude establishment of a circuit between the motor and the source of power independent of the resistance, and means operative automatically on closure of said switch to effect successive closure of the starting contactor and actuation of said means associated with the resistance to establish a circuit between the motor and the source of power independent of the resistance.

CHARLES W. WYMAN.